(12) United States Patent
Hartmann (10) Patent No.: US 10,550,967 B2
(45) Date of Patent: Feb. 4, 2020

(54) CONNECTOR ASSEMBLY

(71) Applicant: Henn GmbH & Co KG., Dornbirn (AT)

(72) Inventor: Harald Hartmann, Dornbirn (AT)

(73) Assignee: Henn GmbH & Co KG., Dornbirn (AT)

( * ) Notice: Subject to any disclaimer, the term of this patent is extended or adjusted under 35 U.S.C. 154(b) by 399 days.

(21) Appl. No.: 15/304,922

(22) PCT Filed: Apr. 23, 2015

(86) PCT No.: PCT/AT2015/050101
§ 371 (c)(1),
(2) Date: Oct. 18, 2016

(87) PCT Pub. No.: WO2015/161333
PCT Pub. Date: Oct. 29, 2015

(65) Prior Publication Data
US 2017/0146159 A1     May 25, 2017

(30) Foreign Application Priority Data

Apr. 24, 2014 (AT) .................................. 50301/2014

(51) Int. Cl.
*F16L 13/14*     (2006.01)
*B21D 39/04*     (2006.01)
*F16L 37/088*    (2006.01)

(52) U.S. Cl.
CPC .......... *F16L 13/147* (2013.01); *B21D 39/046* (2013.01); *F16L 37/088* (2013.01)

(58) Field of Classification Search
CPC ...... F16L 13/147; F16L 37/088; F16L 33/227
(Continued)

(56) References Cited

U.S. PATENT DOCUMENTS

| 5,431,454 A | 7/1995 | Calmettes et al. |
| 6,199,919 B1 * | 3/2001 | Kawasaki ..................... 285/256 |

(Continued)

FOREIGN PATENT DOCUMENTS

| AT | 509196 B1 | 7/2011 |
| CN | 1239201 A | 12/1999 |

(Continued)

OTHER PUBLICATIONS

International Search Report of PCT/AT2015/050101, dated Sep. 14, 2015.

*Primary Examiner* — Zachary T Dragicevich
(74) *Attorney, Agent, or Firm* — Collard & Roe, P.C.

(57) ABSTRACT

A connector assembly has a pipe, a sealing element, and a plug connector which includes a connector body. The connector body has an annular chamber which is located between a first exterior section and a second exterior section of the plug connector. A connecting section of the pipe is inserted into the annular chamber of the connector body from the pipe receiving side and is connected thereto. The connecting section of the pipe includes a fastening recess and a seal receptacle which are incorporated in a circumferential surface of the pipe, the seal receptacle being structurally separated from the fastening recess. The first or the second exterior section is deformed in the region of the seal receptacle in such a way that the sealing element is pressed between the first or second exterior section and the seal receptacle.

15 Claims, 9 Drawing Sheets

(58) Field of Classification Search
USPC .................................................. 285/256, 321
See application file for complete search history.

(56) References Cited

U.S. PATENT DOCUMENTS

| | | | | |
|---|---|---|---|---|
| 6,450,549 B1 * | 9/2002 | Schutz | .................. | F16L 13/143 |
| | | | | 285/256 |
| 7,562,910 B2 | 7/2009 | Kertesz et al. | | |
| 2007/0108763 A1 | 5/2007 | Preisendorfer | | |
| 2009/0072531 A1 * | 3/2009 | Kertesz | .................. | F16L 33/227 |

FOREIGN PATENT DOCUMENTS

| | | | | |
|---|---|---|---|---|
| DE | 197 40 649 A1 | 3/1999 | | |
| DE | 102 03 736 A1 | 7/2003 | | |
| DE | 10 2004 016 597 A1 | 10/2005 | | |
| DE | 10 2006 047 882 B3 | 8/2007 | | |
| EP | 0 627 592 A1 | 12/1994 | | |
| EP | 0 753 698 A1 | 1/1997 | | |
| EP | 2 364 790 A1 | 9/2011 | | |
| JP | 4906973 B1 * | 3/2012 | ............ | F16L 37/088 |
| RU | 2084747 C1 | 7/1997 | | |
| WO | 2005/003615 A1 | 1/2005 | | |
| WO | 2005/103551 A1 | 11/2005 | | |
| WO | 2012/131572 A1 | 10/2012 | | |

\* cited by examiner

Fig.9

CONNECTOR ASSEMBLY

CROSS REFERENCE TO RELATED APPLICATIONS

This application is the National Stage of PCT/AT2015/050101 filed on Apr. 23, 2015, which claims priority under 35 U.S.C. § 119 of Austrian Application No. A 50301/2014 file on Apr. 24, 2014, the disclosure of which is incorporated by reference. The international application under PCT article 21(2) was not published in English.

The invention relates to a connector assembly, as well as to a vehicle equipped with said connector assembly and a method for producing a connector assembly.

From AT 509 196 B1 a method is known for connecting an end section of a line for fluid or gaseous media to a plug connector. The line for fluid or gaseous media is in this case a soft-elastic plastic hose. During the connecting process a first wall section of the plug connector is deformed by deforming the end section of the line between the first and a second wall section of the plug connector with a pressing tool in the direction of the second wall section. Prior to the deformation and/or during the deformation of the first wall section by at least one distance measuring device the surface of the line facing the window opening is detected through a window opening arranged in the first or second wall section and the deformation of the first wall section is performed according to the result of the detection of the surface of the end section of the line by the distance measuring device.

The method described in AT 509 196 B1 for connecting the end sections of a line to the plug connector and/or the design of the plug connector has the disadvantage that only soft-elastic end sections can be connected to a plug connector by means of such a method. For example, a connection to a rigid plastic pipe cannot be performed by such a method.

The underlying objective of the present invention is to create a connector assembly, in which a plug connector is connected advantageously to a pipe, so that the connection point is sealed effectively on the one hand and can be manufactured easily on the other hand and so as to be able to withstand mechanical stresses, as well as a method for producing such a connection.

The objective of the invention is achieved by the measures as claimed in claim 1, and by the method for producing a connector assembly as claimed in claim 13.

According to the invention a connector assembly is formed comprising a pipe, a sealing element and a plug connector. The plug connector comprises a connector body, wherein the connector body comprises an annular chamber, which is between a sleeve-like first casing section of the plug connector annularly surrounding a central longitudinal axis in cross-section and a sleeve-like second casing section of the plug connector annularly surrounding the central longitudinal axis in cross-section. The first casing section is surrounded by the second casing section. The first casing section of the connector body is connected to the second casing section at a first end section with a first end face wall section and the casing sections are open to one another at a second end section, thereby forming a pipe receiving side of the connector body. A connecting section of the pipe is inserted from the pipe receiving side into the annular chamber of the connector body and connected to the latter. The connecting section of the pipe comprises a fixing recess formed on the circumference of the pipe and a seal retainer structurally separate from the latter. In the assembled state of the connector assembly a form-fitting connection is formed between the first or second casing section of the connector body and fixing recess of the pipe. The first or the second casing section is deformed in the region of the seal retainer so that the sealing element is pressed between the first or second casing section and seal retainer.

The advantage of the design according to the invention is that the compression for forming a connection between a pipe and a plug connector has two locally separate pressing points. One pressing point in the region of the fixing recess of the pipe is used to form a form-fitting, mechanically stressable connection between the pipe and plug connector, so that the pipe is positioned relative to the plug connector. This pressing point can absorb high loads, and no demands are made on the sealing effect of the pressing point. A further pressing point in the region of the seal retainer is designed to seal the pipe from the plug connector in cooperation with a sealing element. This pressing point does not need to absorb forces, but here the sealing element fits well on the pipe and on the plug connector, in order to achieve a seal between the two parts. In this way by means of the design of the pressing point according to the invention a connector assembly can be created which compared to other solutions is inexpensive to manufacture and can be processed reliably.

Furthermore, it can be advantageous if both the fixing recess and the seal retainer are formed in an inner casing surface of the pipe, the latter being spaced apart from one another axially. It is an advantage in this case that in this way a pressing tool for producing the connection can press from the inside out. In this way during the pressing process the pipe and the plug connector are subject to radial tension on the circumference. This kind of stress can be absorbed effectively by the individual components. A further advantage is that in this way the pressing point is not visible from the outside. Thus such a connector assembly is suitable for use in the engine compartment of a motor vehicle, where the latter is installed in an accessible place visible to the end customer.

Furthermore, it is possible that the first casing section of the connector body extends in an assembled state of the connector assembly, as viewed in axial direction, at least over the fixing recess and also over the seal retainer of the pipe, so that the compression is performed in the region of the fixing recess and in the region of the of the sealing element by deforming the first casing surface, it is an advantage in this case that both compressions can be performed at the same time by means of only one pressing tool. A further advantage of this design is that the first casing section can be designed in the form of a hollow cylindrical component section, which is simple and inexpensive to produce by means of a deep-drawing process.

Furthermore, it is possible that the fixing recess in the pipe is designed as a groove formed in the inner casing surface which is semi-circular in cross-section. It is an advantage here that a semi-circular groove of this kind can be integrated effectively into the pipe during the production process of the pipe. Furthermore, the first casing surface can be deformed effectively by means of the pressing tool, in order to form with the semi-circular groove a form-fitting connection. In this case on the one hand the groove is formed circumferentially in the pipe. Alternatively, it is possible for the groove to be segmented around the circumference. Furthermore, the shaping of the first casing surface can be circumferential or segmented, wherein a segmented deformation of the first casing surface can be combined with a circumferential groove. A segmented shaping and a segmented groove have the advantage that such segment sections are easy to produce by means of a slider tool which is moved in radial direction.

An embodiment is also advantageous in which the seal retainer of the pipe can be designed as a stepped edge formed on the inner casing surface, in which the sealing element can be mounted. It is an advantage in this case that such a stepped edge can be designed so that the sealing element inserted into the plug connector is not damaged during the assembly of the connector assembly, in particular during the insertion of the pipe into the plug connector. Such a stepped edge can be formed easily and inexpensively during the production process of the pipe, in particular by an injection molding process, whereby also it is not necessary to subsequently process the stepped edge. It is also an advantage that such a stepped edge can be chamfered in order to facilitate the insertion of the sealing element into the seal retainer.

According to one development it is possible that the distance of the seal retainer to an end face wall of the pipe is smaller than the distance of the fixing recess to the end face wall, it is an advantage here that in this way the insertion of the sealing element into the seal retainer is facilitated.

Furthermore, it can be advantageous for the pipe to have an edge in its connecting section, which corresponds with an end face wall of the first casing section, so that the axial position of the pipe can be predefined relative to the plug connector in the assembled state, in particular during the assembly. It is an advantage in this case that in this way the positioning of the pipe relative to the plug connector is facilitated during the assembly of the connector assembly. In this way the process of assembling the connector assembly can have a high degree of repeat accuracy and thus a high degree of processing reliability, whereby the error rate of the production process is reduced. In this way also the number of rejects produced is reduced, and thus also the production costs and product costs can be reduced.

Furthermore, it is possible for the sealing element to have a cylindrical inner casing surface and a cylindrical outer casing surface, whereby in the installed state of the sealing element the cylindrical inner casing surface bears on the first casing section of the connector body and the cylindrical outer casing surface bears on the second casing section. It is an advantage here that during the assembly of the connector assembly the sealing element can be inserted into the plug connector, in particular into the connector body, and does not need to be inserted into the pipe. In this way the assembly of the connector assembly is facilitated, whereby the processing reliability is increased. Furthermore, with such a sealing element the correct fit of the sealing element in the connector body can be controlled effectively. The cylindrical casing surfaces also fit well on the respective corresponding surfaces of the pipe or the connector body. In this way the sealing element in the installed state in the connector assembly can provide a good seal from the corresponding components. An advantage of the cylindrical surfaces of the sealing element is that by means of the cylindrical surfaces the axial sliding of the sealing element is largely avoided during the pressing process. By means of the greater axial extension of the sealing element compared to a round sealing ring, a precise axial position of the sealing element during the pressing process is not absolutely necessary. In this way the processing reliability if increased as positioning errors can be largely avoided with regard to the sealing element.

Furthermore, it is possible for the pipe at its connecting section on the end face wall to have at least one axially extending recess, which corresponds with a positioning tab in the connector body. It is an advantage in this case that by means of such a recess also the angularly correct arrangement of the pipe relative to the plug connector is facilitated and made possible around the axis of rotation of the plug connector. Thus the assembly process of the connector assembly can be highly accurate and there can be high degree of processing reliability, whereby the error rate of the production process is reduced. By these means the production of rejects is also reduced, whereby also the production costs and associated product costs can be reduced.

Furthermore, it can be advantageous that the connector body is made in one piece from a deep-drawn part, in particular a stainless steel sheet. It is advantageous here that such a deep-drawn part can be produced easily and inexpensively especially in series production. Furthermore, such a deep-drawn part can be produced with a high rate of repeat accuracy.

Furthermore, it is possible for the pipe to be made from a plastic, such as polyamide, by means of an injection molding process. A pipe produced in this way has the advantage that it can be produced inexpensively particularly by means of mass production and with a high degree of repeat accuracy. In particular, the measures according to the invention together with a plastic pipe produced in this way have the advantage that a seal retainer formed in the pipe can be produced by simple demolding. Thus no "collapsible cores" have to be used to provide a seal retainer in the pipe, which would lead to the formation of a ridge, thereby damaging the sealing element.

According to a method for connecting a connecting section of a pipe for fluid or gaseous media with a plug connector, the connecting section of the pipe can have a fixing recess formed on a circumferential surface of the pipe and structurally separate from the latter a seal retainer. The plug connector comprises a connector body, which connector body has an annular chamber, which lies between a sleeve-like first casing section of the plug connector annularly surrounding a central longitudinal axis in cross-section and a sleeve-like second casing of the plug connector annularly surrounding the central longitudinal axis in cross-section. The first casing section is surrounded by the second casing section. The first casing section of the connector body is connected to the second casing section at a first end section by a first end face wall section. The casing sections are open to one another at one second end section, whereby a pipe receiving side of the connector body is formed. In a first method step a sealing element is introduced into the annular chamber of the plug connector between the first and second casing section, in particular on the first casing section. In a second method step the connecting section of the pipe is pushed in and positioned from the pipe receiving side of the connector body in the annular chamber of the plug connector. In a third method step a pressing tool deforms the first casing section of the connector body, whereby a first portion of the pressing tool deforms the first casing section so that a form-fitting connection is produced between the pipe and plug connector and a second portion of the pressing tool deforms an axially spaced apart area of the first casing section so that the sealing element is compressed by the first casing section and is thus clamped between the first casing section and pipe.

The advantage of the method of production according to the invention is that the pressing action for forming a connection between a pipe and a plug connector has two separately located pressing points. One pressing point in the region of the fixing recess of the pipe has the job of producing a form-fitting, mechanically stressable connection between the pipe and plug connector so that the pipe is positioned relative to the plug connector. This pressing point can absorb high loads, and no demands are made on the sealing effect of the pressing point. A further pressing point in the region of the seal retainer is designed in cooperation with a sealing element to seal the pipe from the plug connector. Said pressing point does not need to absorb any forces but here the sealing element fits against the pipe and plug connector in order to achieve a seal between the two parts. In this way by means of the design of the pressing point according to the invention a connector assembly is created which can be manufactured inexpensively compared to other solutions and has processing reliability.

Furthermore, it is possible to monitor the movement path of the pressing tool during the shaping process, wherein before deforming and/or on deforming the first casing section by means of at least one distance measuring device the surface of the pipe facing the window opening is detected through a window opening arranged in the first or second wall section and the deformation of the first wall section is performed as a function of the result of the detection of the surface of the end section of the pipe performed by the distance measuring device. It is an advantage in this case that it is possible to check by means of this method whether the pipe is positioned correctly in the intended mount of the connector body. In this way the reliability of the process can be increased, as fewer demands are made regarding the accuracy of the pipe used. Furthermore, it is possible by means of this method that the form-fit between the pipe and plug connector and also the sealing surface between the pipe and plug connector have a sufficiently high degree of precision in order to ensure a good fit of the two parts relative to one another.

According to one particular embodiment it is possible that during the shaping process the force applied by the pressing tool on the first casing section is measured and actively prespecified. It is an advantage in this case that the strength of the press fitting of the pipe onto the plug connector and the sealing effect of the two parts can be influenced relative to one another and pre specified.

Lastly, it is possible that before the third method step to check the correct positioning of the sealing element in the plug connector by means of a measuring device, it is an advantage in this case that it is possible to determine prior to the pressing process whether the sealing element is correctly positioned, it is thus possible that as little waste as possible is produced and thus processing reliability can be increased.

For a better understanding of the invention the latter is explained in more detail with reference to the following Figures.

In a much simplified, schematic representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
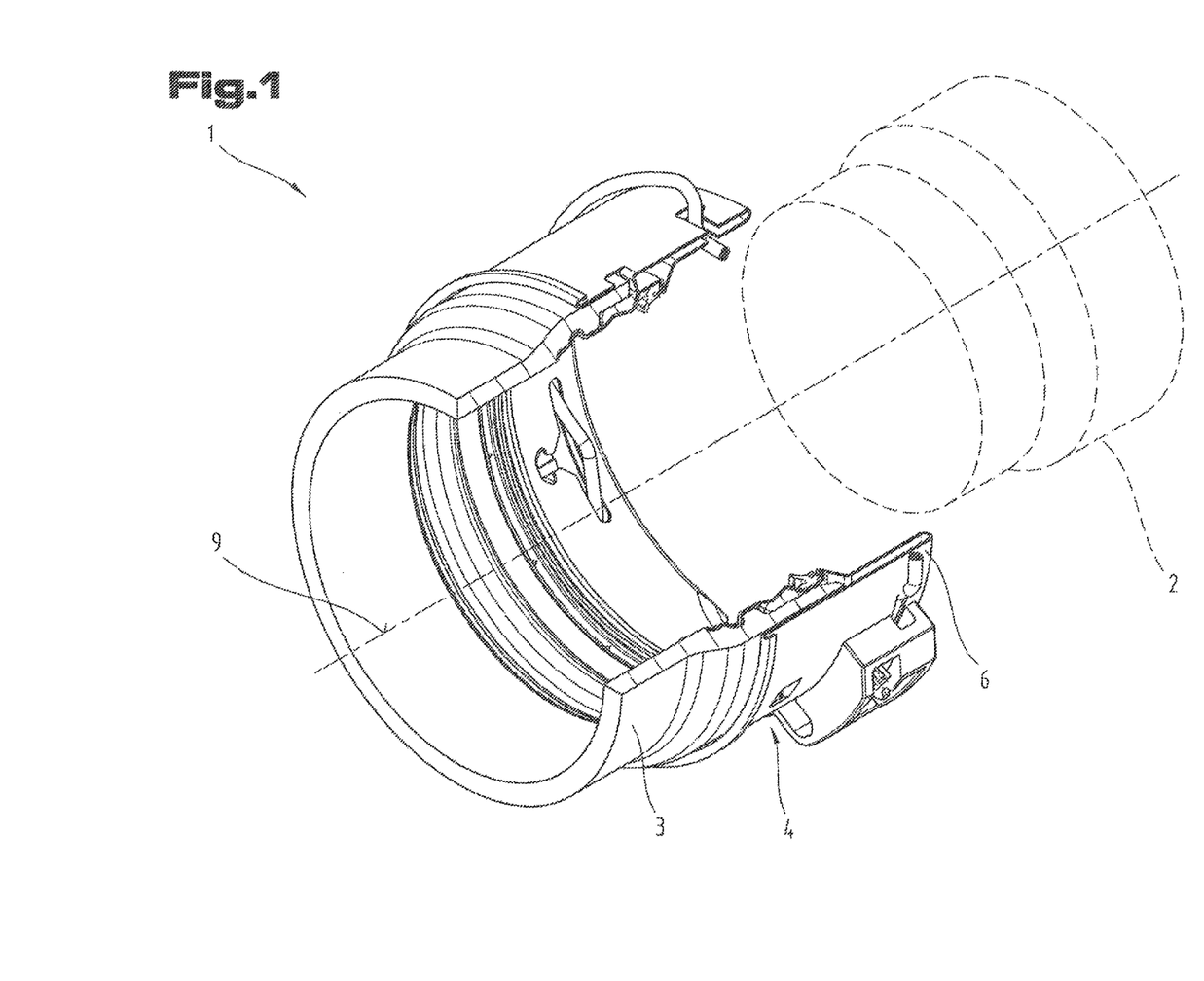
FIG. 1 shows a perspective view of a connector assembly with a quarter removed.

FIG. 1 shows, a perspective view of a connector assembly 1, wherein the latter is shown with a quarter removed. Furthermore, FIG. 1 shows schematically a mating connector 2 which can be connected to the connector assembly 1. The interaction between the connector assembly 1 and mating connector 2 is described in detail in AT 509 196 B1.

FIG. 1 shows the connector assembly 1 in an assembled state. The connector assembly 1 comprises a pipe 3, a plug connector 4 as well as a sealing element 5 inserted between the plug connector 4 and pipe 3. The plug connector 4 comprises a connector body 6, which is preferably in the form of a one-piece molded part, such as a deep-drawn part made from a stainless steel sheet.

Figure 2:
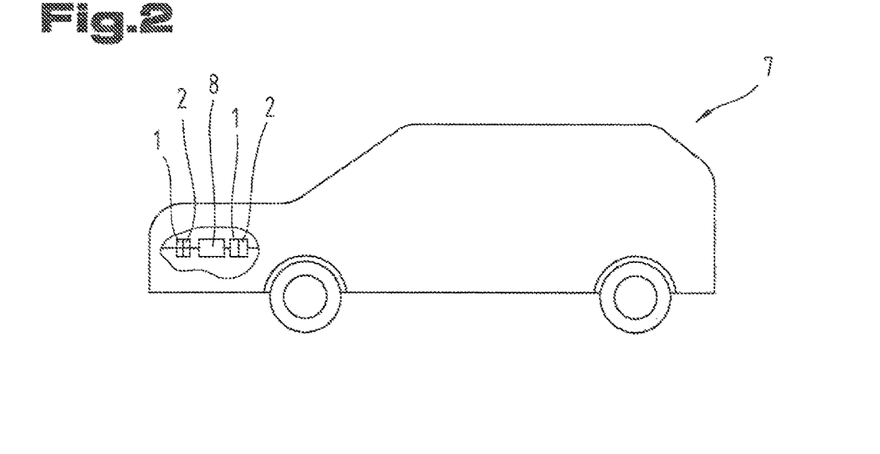
FIG. 2 shows a vehicle connected to the connector assembly.

FIG. 2 shows a schematic view of a vehicle 7 with an installed connector assembly 1 according to FIG. 1. As shown in FIG. 2 the connector assembly 1 is preferably inserted into a vehicle 7, in particular into a road-bound motor vehicle with an internal combustion engine. In particular, the connector assembly 1 is used for connecting different components of the fresh air supply to the combustion engine. For example, it is possible that the connector assembly 1 is provided with the corresponding mating connector 2 for connecting two parts in the suction area of a turbocharger 8. Furthermore, it is also possible for such a plug connection to be inserted in the pressure side from the turbocharger 8 for connecting two components.

Figure 3:
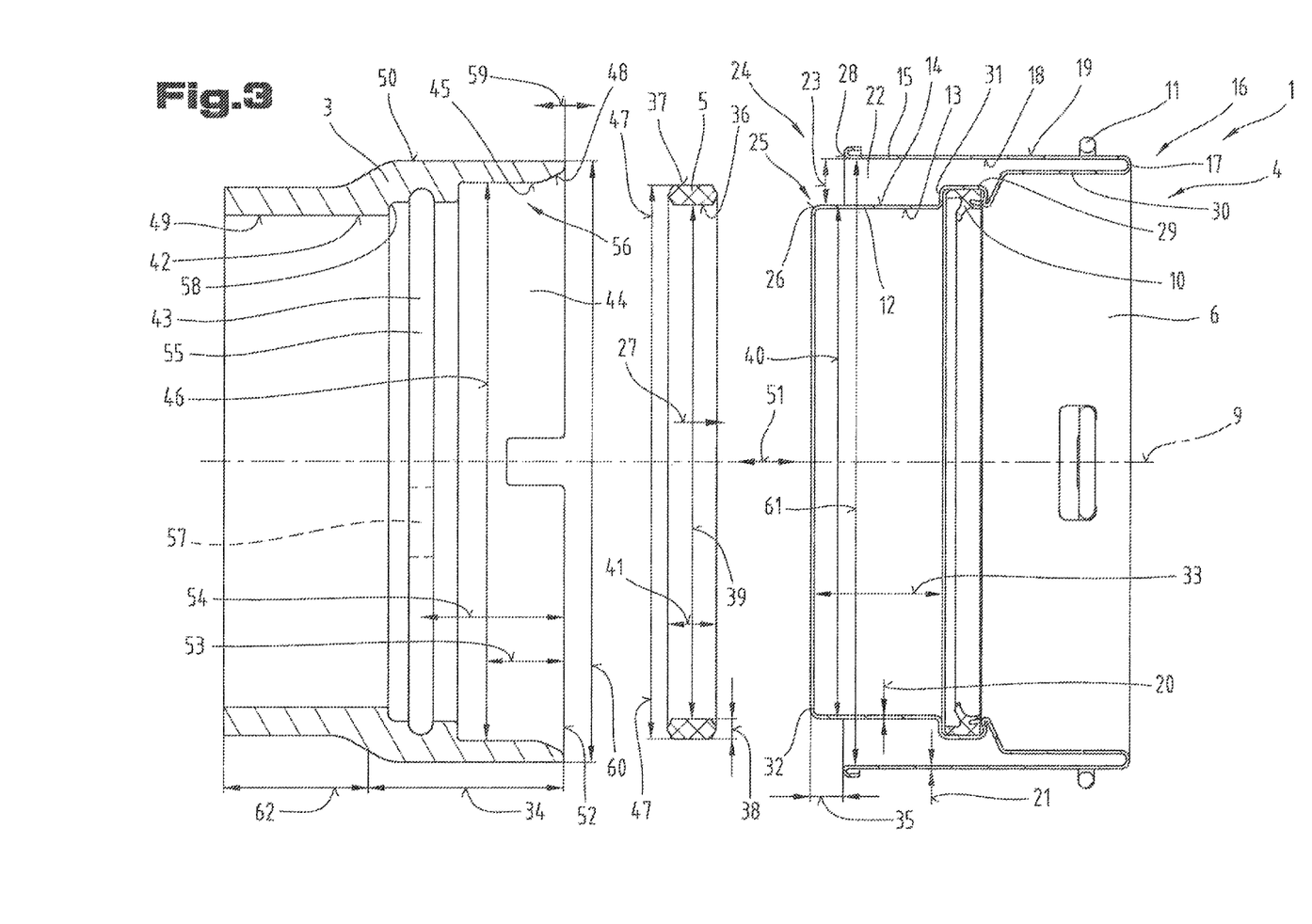
FIG. 3 shows a cross-sectional view of the connector assembly in an exploded view.

FIG. 3 shows a cross-section of the connector assembly 1 along a central longitudinal axis 9 of the plug connector 4. In order to describe the individual components effectively, the latter are shown in an exploded view in FIG. 3.

As shown in FIG. 3, the plug connector 4 comprises, in addition to the connector body 6, a plug seal 10, which is mounted in the connector body 6. The plug seal 10 is used to seal the connector assembly 1 sufficiently in the assembled state to a mating connector 2.

Furthermore, the plug connector 4 comprises a spring element 11 by means of which the connector assembly 1 can be secured in position relative to the mating connector 2 plugged to the connector assembly 1. The spring element 11 is constructed so that it can be activated and deactivated easily, so that if necessary the connector assembly 1 and the mating connector 2 can be separated from one another or connected to one another.

A shown in FIG. 3, on the connector body 6 a first casing section 12 is formed which surrounds the central longitudinal axis 9 of the plug connector 4 in the manner of a sleeve. In other words, the first casing section 12 is a rotationally symmetrical hollow cylinder.

The first casing section 12 comprises an inner casing surface 13 and an outer casing surface 14. The first casing section 12 surrounds a second casing section 15, which is also designed to be rotationally symmetrical relative to the central longitudinal axis 9. The first casing section 12 is connected to the second casing section 15 at a first end section 16 by means of a first end face wall section 17.

As with the first casing section 12 the second casing section 15 also has an inner casing surface 18 and an outer casing surface 19.

The first casing section 12 is delimited by its inner casing surface 13 and the outer casing surface 14, whereby a wall thickness 20 of the first casing section 12 is obtained. The second casing section 15 is also delimited by an inner casing surface 18 and an outer casing surface 19, whereby a wall thickness 21 of the second casing, section 15 is obtained.

By means of the mutual spacing, of the two casing sections 12, 15 an annular chamber 22 is formed. The annular chamber 22 is delimited in particular in radial direction by the outer casing surface 14 of the first casing section 12 and by the inner casing surface 18 of the second casing section 15. In particular, an annular chamber gap 23 is formed. Said annular chamber gap 23 is preferably selected to be dimensioned so that the pipe 3 can be mounted in the latter at least partly. In the shown example embodiment the annular chamber gap 23 is between 2 mm and 20 mm, in particular, between 3 mm and 10 mm, preferably between 5 mm and 7 mm.

The two casing sections 12, 15 are open to one another at a second end section 24 of the plug connector 4, whereby a pipe receiving side 25 of the connector body 6 is formed.

It is possible that the first casing section 12 has a beveling 26, which is formed on the pipe receiving-side 25 of the first casing section 12. The advantage of such beveling 26 is that a sealing element 5 can be pushed easily in a pushing-in direction 27 onto the first casing section 12. Furthermore, it is also the case that the second casing section 15 has such a beveling 28, so that the pipe 3 can also be pushed easily into the annular chamber 22.

The beveling 26, 28 can be in the form of beading for example which has suitable radii and are preferably shaped during the deep-drawing process.

Furthermore, it is possible that a seal retainer 29 is attached to the first casing section 12 as viewed in the direction of the first end section 16 of the plug connector 4, which seal retainer is also formed in the connector body 6. In such a seal retainer 29 a plug seal 10 can be mounted. Furthermore, it is possible that a third casing section 30 adjoins the seal retainer 29, which casing section is used for receiving the mating connector 2. The end face wall section 17 can adjoin the third casing section 30, which connects the third casing section 30 to the second-casing section 15. By means of this structure or connection, as already mentioned, the first casing section 12 is connected via the end face wall section 17 to the second casing section 15.

Preferably, the connector body 6 is produced in a deep-drawing process, wherein all of the wall thicknesses of the casing sections of the connector body 6 have approximately the same dimension.

As shown in FIG. 3, it can also be advantageous for the seal retainer 29 to have an end face wall 31 which adjoins the first casing section 12. The end face wall 31 can be bent here in particular in the direction of the second casing section 15, whereby a receiving recess is formed for the plug seal 10.

The design of the end face wall 31 also has the advantage that during the assembly of the connector assembly 1 the sealing element 5 can be pushed in pushing-m direction 27 into the annular chamber 22 until it bears on the end face wall 31. Thus the end face wall 31 can also be used to facilitate the positioning process of the sealing element 5. In other words, the end face wall 31 is used as an axial positioning stop for the sealing element 5.

The first casing section 12 also has an end face wall 32 on its pipe receiving side 25, which can be used as a positioning stop for the pipe 3.

An axial extension 33 of the first casing section 12 is preferably dimensioned such that the annular chamber 22 has a sufficient length in order to receive the sealing element 5 and a connecting section 34 formed on the pipe 3.

Furthermore, it is possible that the first casing section 12 extends further in the direction of the pipe receiving side 25 than the second casing section 15 and thus protrudes a certain distance 35 relative to the second casing section 15 as viewed in axial direction.

Also the sealing element 5 is substantially a rotationally symmetrical body, wherein a substantially rectangular cross-section is designed to be rotationally symmetrical about the central longitudinal axis 9, in this way an inner casing surface 36 and an outer casing surface 37 are formed on the sealing element 5, which are arranged at a specific distance from one another, whereby a wall thickness 38 of the sealing element 5 is obtained. The wall thickness 38 of the sealing element 5 is preferably dimensioned such that the sealing element 5, which is preferably made from a soft-elastic material, can be easily deformed. Preferably, a wall thickness 38 is selected of between 1 mm and 10 mm, in particular between 2 mm and 5 mm to obtain a sealing element 5, which can perform its function as effectively as possible.

An internal diameter 39 of the sealing element 5 is selected to be the same as an external diameter 40 of the first casing section 12. It is an advantage if the two diameters 39, 40 are adjusted to one another so that the sealing element 5 can be pushed easily onto the first casing section 12 and achieves a good fit there. In the shown example embodiment the internal diameter 39 of the sealing element 5 is approximately 62 mm.

A width 41 of the sealing element 5 can preferably be selected so that the latter is between approximately 200% and 400% of the thickness 38 of the sealing element 5. By means of this configuration of the sealing element 5 it is possible that the latter can perform its function as effectively as possible in the assembled state in the connector assembly 1.

The connecting section 34 of the pipe 3 comprises a fixing recess 43 formed on a circumferential surface 42. The fixing recess 43 is preferably formed in an inner circumferential surface 42 of the pipe 3. In a further embodiment variant, which is not shown in more detail, it is also possible for the fixing recess 43 to be formed in an outer circumferential surface 42 of the pipe 3.

Furthermore, the pipe 3 comprises a seal retainer 44 which interacts in an assembled state of the connector assembly 1 with the sealing element 5. In particular, it is possible that in an assembled state of the connector assembly 1 the outer casing surface 3 of the sealing element 5 bears against an inner casing surface 45 of the seal retainer 44. For this purpose it is advantageous if an internal diameter 46 of the seal retainer 44 is selected to be approximately the same size as an external diameter 47 of the sealing element 5. Preferably, the two diameters 46, 47 are selected so that the pipe 3 can be pushed easily over the sealing element 5 during the assembly process of the connector assembly 1.

In order to facilitate the assembly process it is possible for the seal retainer 44 to have beveling 48.

In a preferred embodiment variant, as shown in FIG. 3, it is possible that both the fixing recess 43 and also the seal retainer 44 are inserted into an inner casing surface 49 of the pipe 3.

Furthermore, it is also possible that the fixing recess 43 and/or the seal retainer 44 are attached to an outer casing surface 50 of the pipe.

The fixing recess 43 and the seal retainer 44 are preferably spaced apart from one another axially in the pipe 3. The pipe 3 has an end face wall 52, which is mounted in an assembled state in the connector body 6, in particular in the annular chamber 22.

A distance 53 of the seal retainer 44 from the end face wall 52 can be smaller according to the shown example embodiment than a distance 54 of the fixing recess 43 from the end face wall 52.

In a preferred embodiment it is possible that the seal retainer 44 is designed as a stepped edge 56 formed in the inner casing surface 49 of the pipe 3. A configuration of the seal retainer 44 as a stepped edge 56 is used so that during the assembly of the connector assembly 1 it is possible to secure the sealing element 5 relative to its axial position.

The fixing recess 43 is preferably designed as a semicircular groove 55 in cross-section, which is introduced into the inner casing surface 49 of the pipe 3. According to a first embodiment variant it is possible for the groove 55 to be designed as a circumferential groove.

According to a further embodiment variant it is possible that the groove 55 is segmented as viewed over the circumference and thus comprises intermediate webs 57, which interrupt the groove 55. Such an embodiment variant can be down to the manufacturing process in particular.

Furthermore, it is possible that the pipe 3 has an edge 58 on its inner casing surface 49, which edge in an assembled state corresponds with the end face wall 32 of the first casing section 12 so that the axial position 59 of the pipe 3 can be determined relative to the plug connector 4.

An external diameter 60 of the pipe 3 is preferably selected so that it is smaller than an internal diameter 61 of the second casing section 15 of the connector body 6. In this way during the assembly of the connector assembly 1 the pipe 3 can be pushed easily into the annular chamber 22 of the connector body 6.

Furthermore, it is possible that in the region of its connecting section 34 the pipe 3 has a greater wall thickness than in a cylindrical pipe section 62.

An assembly of the connector assembly 1 is described in the following with reference to the drawing in FIG. 3.

In a first method step the sealing element 5 is inserted into the annular chamber 22. In this way the sealing element 5 can be displaced in the annular chamber 22 in pushing-in direction 27 until it bears against the end face wall 31 of the seal retainer 29. In a further method step the correct position of the sealing element 5 in the connector body 6 can now be checked. More detailed explanations of this method step are provided in the following description of the Figures. If the sealing element 5 is positioned correctly in the connector body 6 in a further method step the pipe 3 can be inserted in pushing-in direction 27 into the annular chamber 22. Preferably, the pipe 3 is inserted into the annular chamber 22 until the edge 58 of the pipe 3 bears against the end face wall 32 of the first casing section 12 of the connector body 6. In this way also the axial position 59 of the pipe 3 is fixed relative to the connector body 6.

Figure 4:
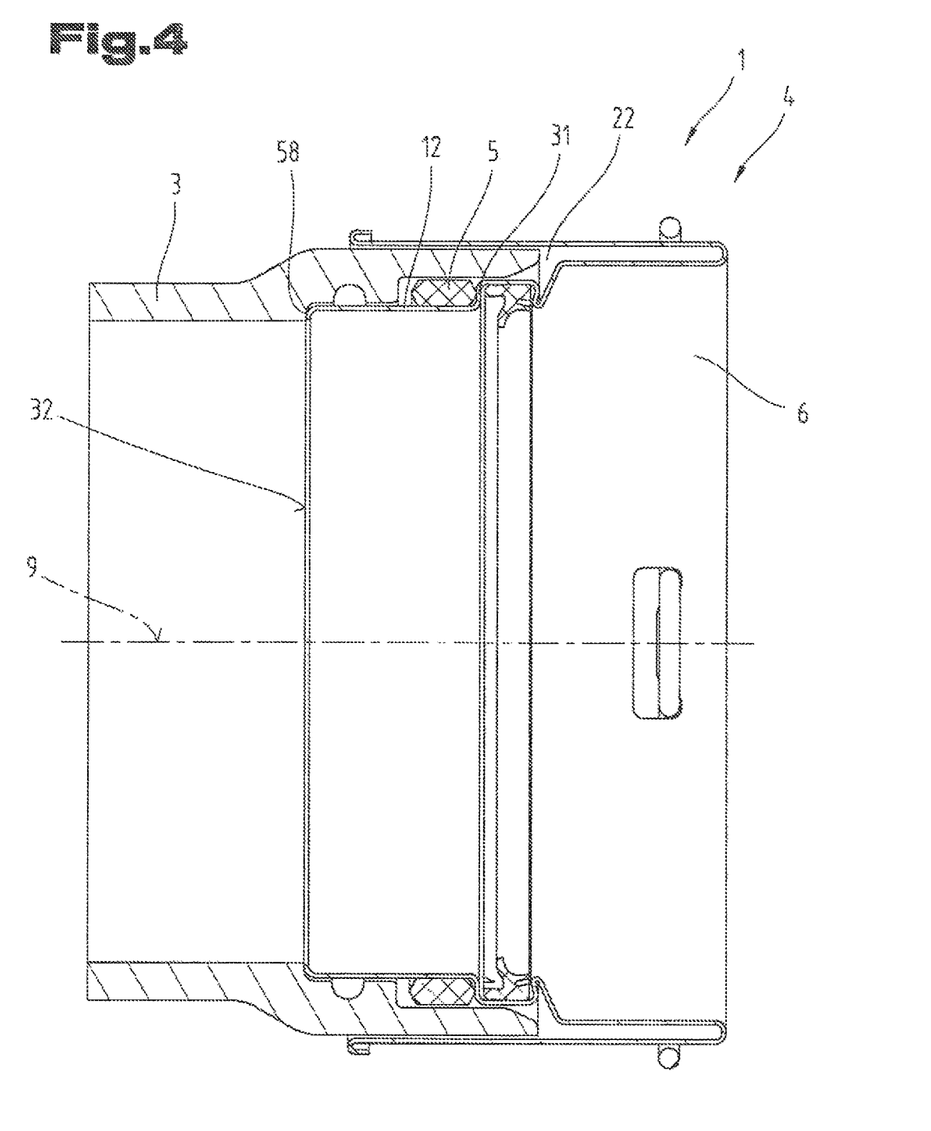
FIG. 4 shows a cross-sectional view of the connector assembly according to FIG. 3 in an assembled position.

FIG. 4 shows a cross-sectional view according to FIG. 3. However, in this view both the sealing element 5 and also the pipe 3 are shown in a plugged together position in which they are pushed into the annular chamber 22 of the connector body 6. In FIG. 4 the same reference numerals and component names are used for the same parts as in the preceding FIG. 3. To avoid unnecessary repetition reference is made to the detailed description of the preceding FIG. 3.

As shown in FIG. 4 in an assembled state of the connector assembly 1 the sealing element 5 bears on the end face wall 31 of the seal retainer 29.

The pipe 3 is thereby positioned relative to its axial displaceability so that the edge 58 of the pipe 3 bears on the end face wall 32 of the first casing section 12.

In order to fix the individual components to one another it is possible that in a further method step for producing the connector assembly 1 the first casing surface 12 is pressed so that a form-fitting connection is produced between the first casing surface 12 and pipe 3. The pressing method itself is explained in more detail in the following in the description of the Figures.

In a further, not shown embodiment variant, in which the fixing recess 43 and/or the seal retainer 44 are made in an outerlying circumferential surface 42 of the pipe 3, it is also possible that the second casing section 35 is pressed to make a suitable connection.

Figure 5:
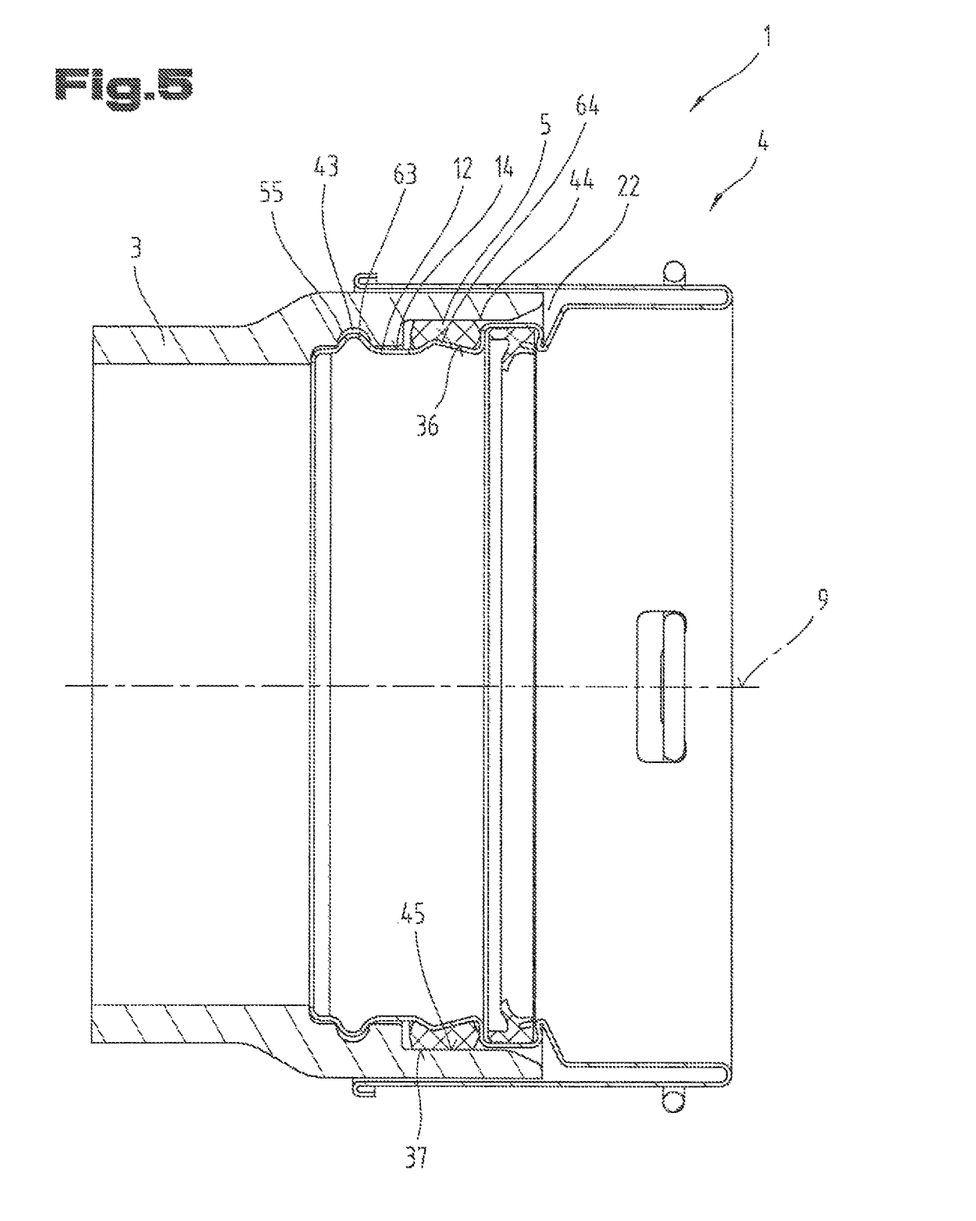
FIG. 5 shows a cross-sectional view of the connector assembly according to FIG. 3 and FIG. 4 in an assembled and compressed position.

FIG. 5 shows a further cross-sectional representation of the connector assembly 1 according to the views in FIGS. 3 and 4. In FIG. 5 the same reference numerals and components names are used for the same parts as in the preceding FIGS. 3 and 4. To avoid unnecessary repetition reference is made to the detailed description of the preceding FIG. 3.

In the cross-sectional view of FIG. 5 the connector assembly 1 is shown in a compressed position. As shown in FIG. 5, the first casing section 12 is deformed at a first deformation point 63 so that a form-fitting connection is formed between a first casing section 12 and fixing recess 43. In particular, the first casing section 12, particularly the outer casing surface 14 of the first casing section 12, is tightly fitted against the groove 55. By means of this first deformation point 63 the pipe 3 can be secured, in its axial position relative to the connector body 6.

A second deformation point 64 located separately from this first deformation point 63 is formed in which the first casing section 12 of the connector body 6 is deformed such that the sealing element 5 is clamped between the first casing section 12 and the seal retainer 44 of the pipe 3. By means of this clamping there is also a deformation of the sealing element 5, which is preferably made from a soft-elastic material, such as rubber.

In particular, the inner casing surface 36 of the seating element 5 is pressed against the outer casing surface 14 of the first casing section 12, so that the latter bear against one another tightly. Furthermore, the outer casing surface 37 of the sealing element 5 is pressed onto the inner casing surface 45 of the seal retainer 44 in the pipe 3, so that said surfaces also fit against one another tightly. By means of this second deformation point 64 and the associated pressing of the sealing element 5 it is possible for the pipe 3 to be sealed sufficiently from the plug connector 4, in order to prevent the outflow of pressurized gas.

Figure 6:
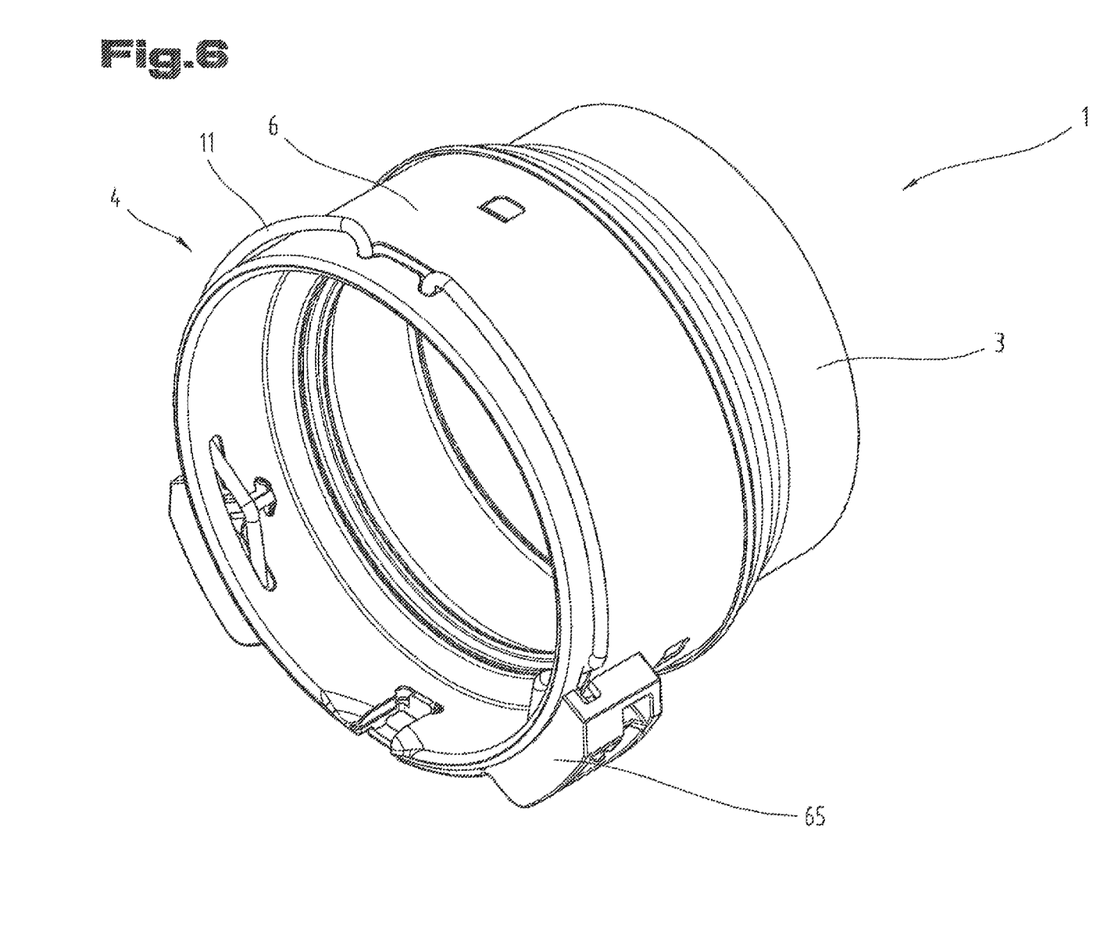
FIG. 6 shows a perspective view of the connector assembly.

FIG. 6 shows a perspective view of the connector assembly 1 according to FIGS. 1 to 5, wherein the latter is shown in an assembled state. FIG. 6 shows that the plug connector 4 can also comprise additional components 65 in addition to the connector body 6 and the spring element 11, which interact in particular with the spring element 11 and form a closing mechanism together with the latter.

Figure 7:
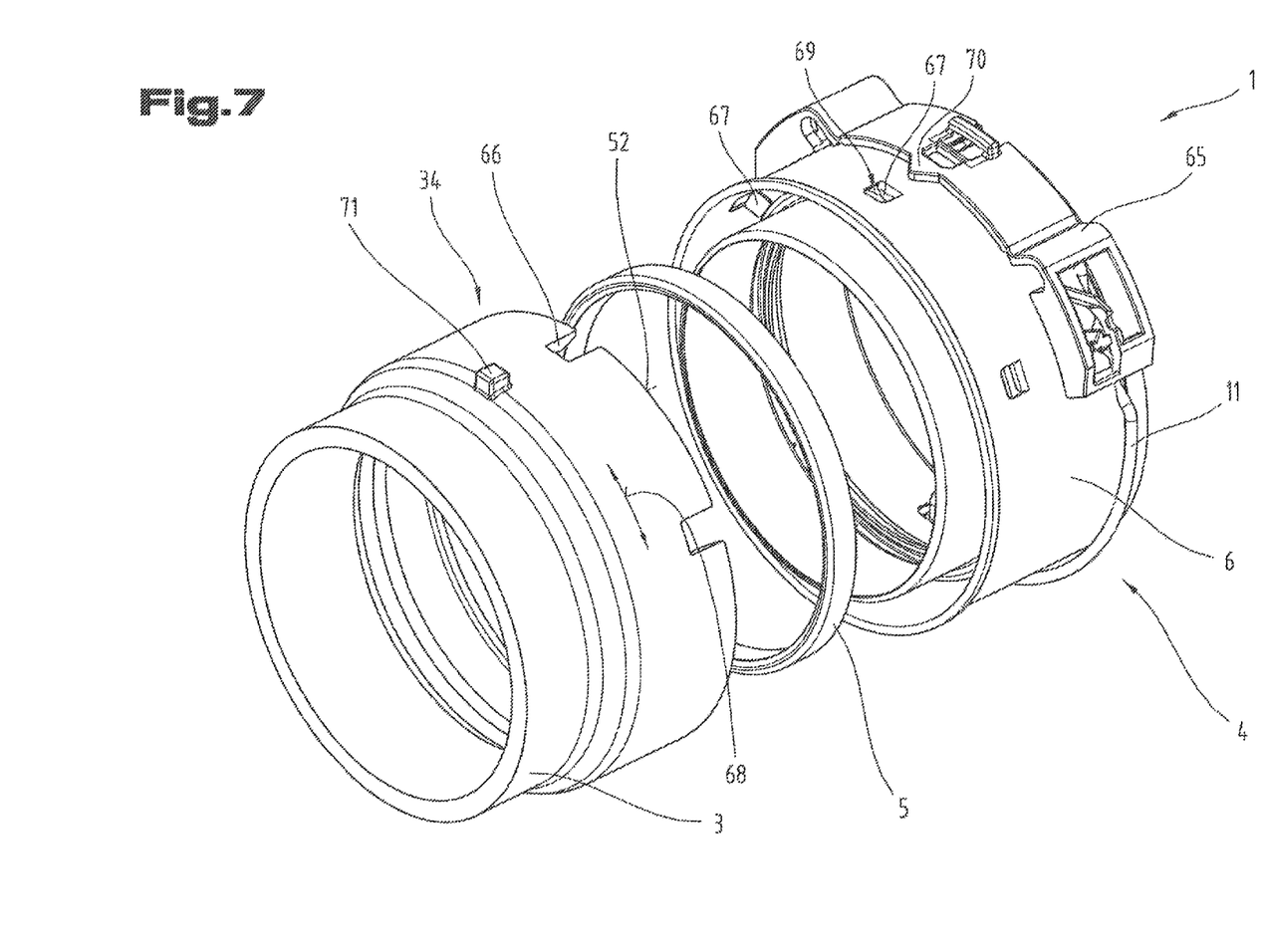
FIG. 7 shows a perspective view of the connector assembly in an exploded view.

FIG. 7 shows a further perspective view of the connector assembly 1 according to FIGS. 1 to 5, wherein the latter is shown in an exploded view, so that the individual components are visible.

In particular, in the variant shown in FIG. 7 it can be seen that the pipe 3 has a recess 66 which cooperates with a positioning tab 67 in the connector body 6. The recess 66 is preferably an axially extending recess, which is introduced from the end face wall 52 of the pipe 3 into the connecting section 34. Such a combination of a recess 66 and positioning tab 67 can be used to position the pipe 3 correctly in its angular position 68 relative to the plug connector 4.

The positioning tab 67 in the connector body 6 can be formed in that during the deep-drawing process to produce the connector body 6 in a transverse processing step it is stamped inwardly from the second casing section 15. By means of this process a window opening 69 is also formed, through which by means of an optical measurement device the correct position of the sealing element 5 can be checked during installation.

According to the view in FIG. 7 it is also possible that not just one positioning tab 67 is formed but that a plurality of positioning tabs 67 are formed.

Furthermore, it is possible that the additional component 65 has a display arrow 70 by means of which the correct position of the plug connector 4 relative to the mating connector 2 to be connected thereto can be displayed. In particular, it can be advantageous that a display nose 71 of the pipe 3, in an overview with the display arrow 70, shows the correct position of the pipe 3 relative to the plug connector 4.

Figure 8:
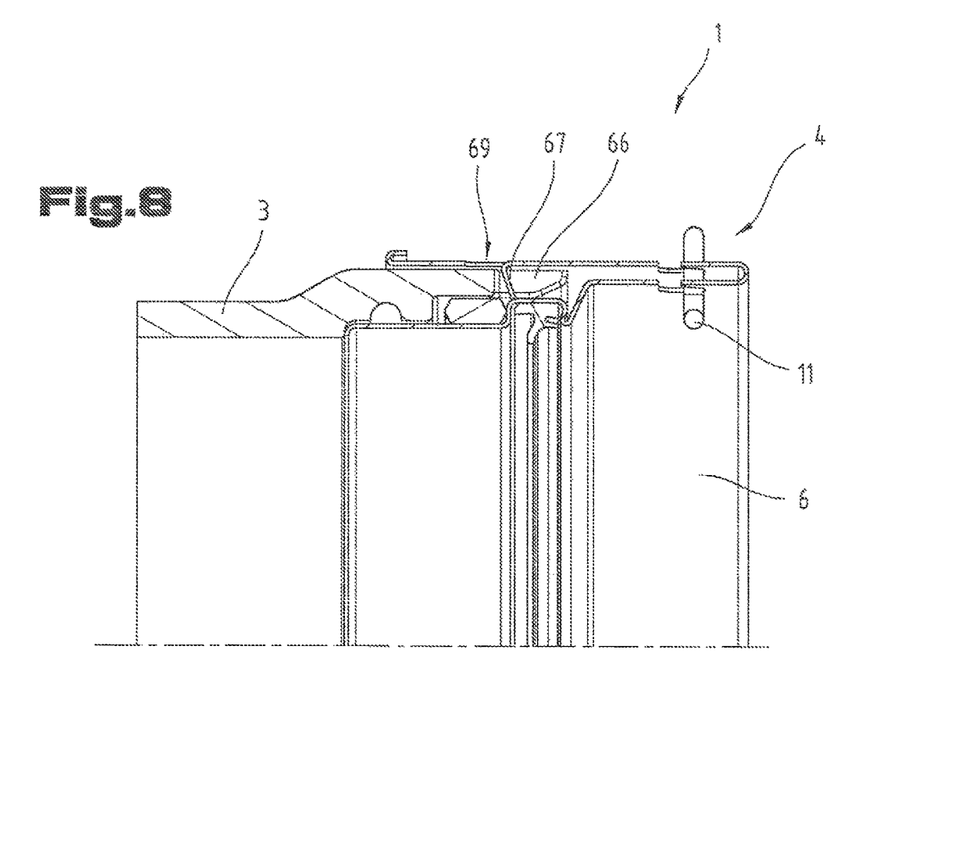
FIG. 8 shows a cross-sectional view of the connector assembly with a section through a window in the outer casing.

FIG. 8 shows a further cross-sectional representation of the connector assembly 1 in an assembled and compressed state, wherein here the path of the cross-section is such that it runs precisely through a window opening 69. This shows clearly how the positioning tab 67 of the connector body 6 cooperates with the recess 66 of the pipe 3. Here too reference is made to the preceding FIGS. 1 to 7 for the sake of brevity.

Figure 9:
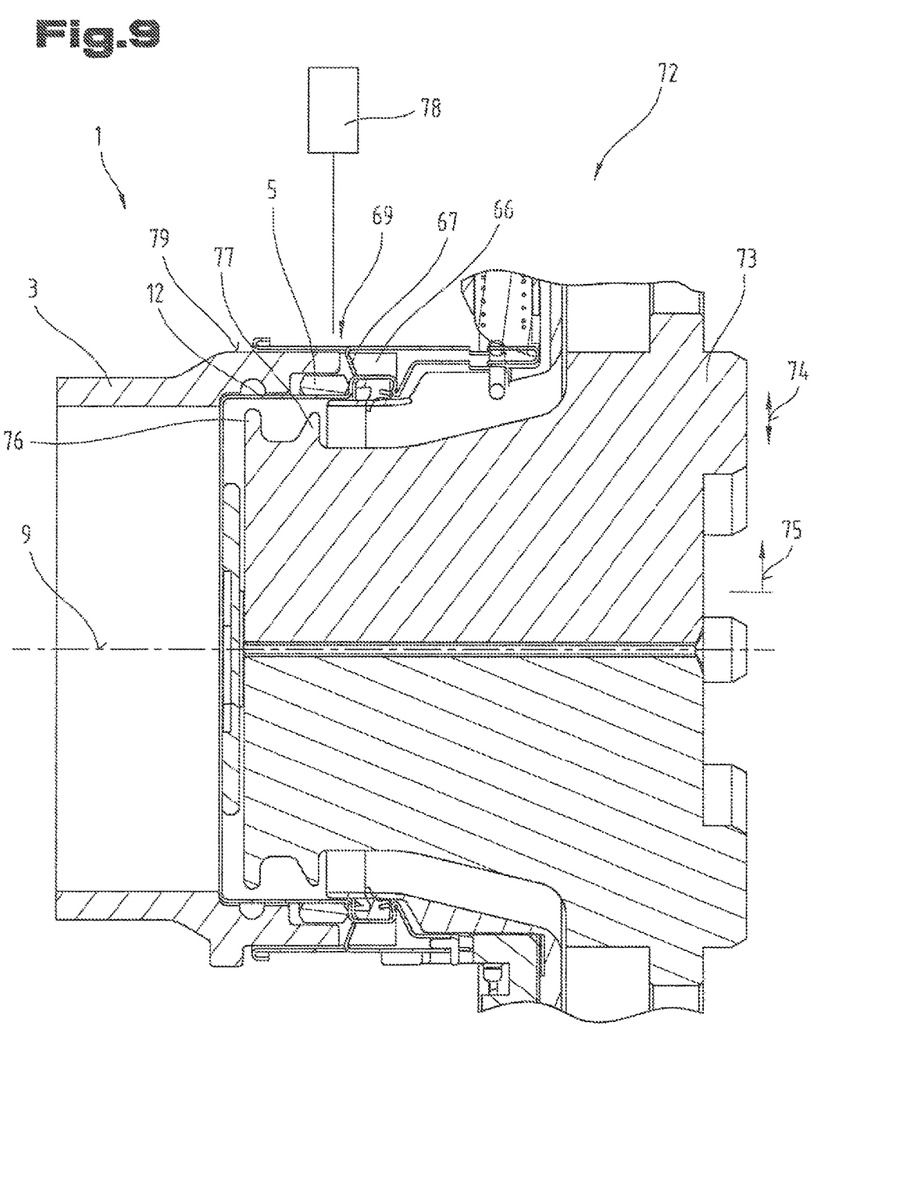
FIG. 9 shows a cross-sectional view of the connector assembly with a press tool.

FIG. 9 shows a cross-sectional view of a pressing machine 72 with a clamped connector assembly 1 according to FIGS. 1 to 8, wherein here too the path of the cross-section is selected along the central longitudinal axis 9.

Figure 10:
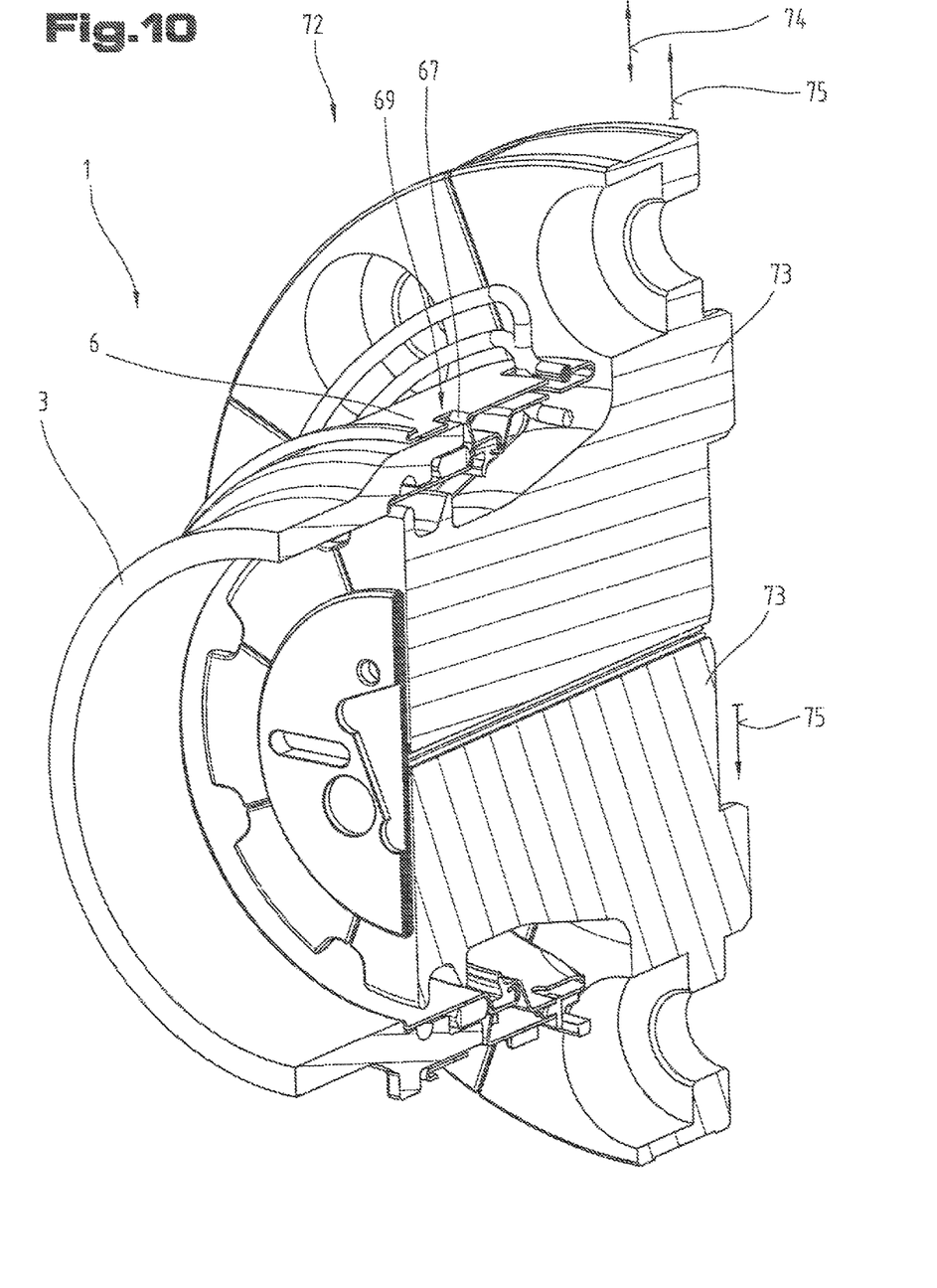
FIG. 10 shows a perspective view of the connector assembly with a press tool.

FIG. 10 shows a perspective view of the cross-sectional representation according to FIG. 9.

As shown from an overview of FIG. 9 and FIG. 10 the pressing machine 72 comprises a pressing tool 73, by means of which the first casing section 12 of the connector body 6 can be deformed and thus the pressing connection of the connector assembly 1 can be formed. The pressing tool 73 moves during the pressing process in radial direction 74. In order to form a tight connection between the plug connector 4 and mating connector 2, a specific movement path 75 is required which the pressing tool 73 has to cover.

The pressing tool 73 is designed such that it has two portions. One of the first portions 76 deforms the first casing section 12 so that a first deformation point 63 is formed. The first deformation point 63 here forms a form-fitting connection between the pipe 3 and connector body 6. One of the second portions 77 of the pressing tool 73 produces a second deformation point 64 by means of which the sealing element 5 is clamped.

Furthermore, a distance measuring de vice 78 can be provided which detects the outer surface 79 of the pipe 3 facing the window opening 69 through the window opening 69 arranged in the second casing section 15. In this way the deformation of the first casing section 12 can be performed according to the result of the detection of the surface 79 of the pipe 3 carried out by the distance measuring device 78.

Furthermore, it is possible for the distance measuring device 78 to detect the correct positioning of the sealing element 5 on the first casing section 12 before inserting the pipe 3 into the annular chamber 22.

Furthermore, it is possible that the distance measuring device 78 can be used to determine the external diameter 40 of the first wall section 12. This information can be used, in the pressing machine 72 for example to control the movement path 75 on the basis of the measured external diameter 40. In this way on measuring a larger external diameter 40 the movement path 75 of the pressing tool 73 can also be increased so that the degree of pressing in connector assemblies 1 which vary slightly because of manufacturing tolerances is kept constant.

The example embodiments show possible embodiment variants of the connector assembly 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, individual features or combinations of features from the various shown and described example embodiments can represent in themselves independent solutions according to the invention.

The problem addressed by the independent solutions according the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure of the connector assembly 1, the latter and its components have not been represented true to scale in part and/or have been enlarged and/or reduced in size.

LIST OF REFERENCE NUMERALS 1 connector assembly
2 mating connector
3 pipe
4 plug connector
5 sealing element
6 connector body
7 vehicle
8 turbocharger
9 longitudinal axis of the plug connectors
10 plug seal
11 spring element
12 first casing section
13 inner casing surface
14 outer casing surface
15 second casing section
16 first end section plug connector
17 end face wall section
18 inner casing surface
19 outer casing surface
20 wall thickness first casing section 21 wall thickness second casing section
22 annular chamber
23 annular chamber gap
24 second end section plug connector
25 pipe receiving side
26 beveling
27 pushing-in direction
28 beveling
29 seal retainer plug connector
30 third casing section
31 end face wall seal retainer
32 end face wall first casing section
33 axial extension first casing section
34 connecting section
35 distance
36 inner casing surface sealing element
37 outer casing surface sealing element
38 wall thickness sealing element
39 internal diameter sealing element
40 external diameter first casing section
41 wide sealing element
42 circumferential surface
43 fixing recess
44 seal retainer pipe
45 inner casing surface seal retainer
46 internal diameter seal retainer
47 external diameter sealing element
48 beveling
49 inner casing surface of the pipe
50 outer casing surface of the pipe
51 axial direction
52 end face wall pipe
53 distance seal retainer end face wall
54 distance fixing recess end face wall
55 groove
56 stepped edge
57 intermediate web
58 edge
59 axial position of the pipe
60 external diameter pipe
61 internal diameter second casing section
62 cylindrical pipe section
63 first shaping point
64 wide shaping point
65 further component
66 recess
67 positioning tab
68 angular position
69 window opening
70 display arrow
71 display nose
72 pressing machine
73 pressing tool
74 radial direction
75 movement path
76 first portion
77 second portion
78 distance measuring device
79 surface

The invention claimed is:

1. A connector assembly comprising:
(a) a pipe;
(b) a sealing element; and
(c) a plug connector with a connector body;
wherein the connector body has an annular chamber which lies between a sleeve-like, first casing section of the plug connector annularly surrounding a central longitudinal axis in cross-section and a sleeve-like second casing section of the plug connector annularly surrounding the central longitudinal axis in cross-section,
wherein the first casing section is surrounded by the second casing section, and the first casing section of the connector body is connected to the second casing section at a first end section by a first end wall section, and the casing sections are open to one another at a second end section, whereby a pipe receiving side of the connector body is formed,
wherein a connecting section of the pipe is inserted from the pipe receiving side into the annular chamber of the connector body and connected to the latter,
wherein the connecting section of the pipe comprises a fixing recess formed on a circumferential surface of the pipe and a seal retainer which is structurally separate from the latter,
wherein in an assembled state of the connector assembly a form-fitting connection is produced between the first or second casing section of the connector body and fixing recess of the pipe,
wherein the first or the second casing section is deformed in the region of the seal retainer such that the sealing element is pressed between the first or second casing section and seal retainer,
wherein both the fixing recess and the seal retainer are arranged in an inner casing surface of the pipe, and
wherein the fixing recess and the seal retainer are spaced apart from one another axially.

2. The connector assembly according to claim 1, wherein the fixing recess is formed in the pipe as a groove, which is semi-circular in cross-section, formed in the inner casing surface of the pipe.

3. The connector assembly according to claim 1, wherein the distance of the seal retainer from an end face wall of the pipe is smaller than the distance of the fixing recess from the end face wall.

4. The connector assembly according to claim 1, wherein the pipe has an edge in its connecting section which corresponds with an end face wall of the first casing section, so that the axial position of the pipe can be defined relative to the plug connector in the assembled state.

5. The connector assembly according to claim 1, wherein the connector body is designed as a one-piece molded part.

6. The connector assembly according to claim 1, wherein the pipe is made from plastic by an injection molding method.

7. A vehicle, with a connector assembly arranged on the suction side or pressure side of a turbocharger, wherein the connector assembly is designed according to claim 1.

8. A method for connecting a connecting section of a pipe for liquid or gaseous media with a plug connector, wherein the connecting section of the pipe comprises a securing recess formed on a circumferential surface of the pipe and a seal retainer structurally separated from the latter, wherein both the securing recess and the seal retainer are arranged in an inner surface of the pipe, wherein the securing recess and the seal retainer are spaced apart from one another axially, and wherein the plug connector comprises a connector body, which connector body comprises an annular chamber, which is between a sleeve-like, first casing section of the plug connector annularly surrounding a central longitudinal axis in cross-section and a sleeve-like second casing section of the plug connector annularly surrounding the central longitudinal axis in cross-section, wherein the first casing section is surrounded by the second casing section and the first casing section of the connector body is connected to the second casing section at a first end section by a first end wall section, and the casing sections at a second end section are open to one another, whereby a pipe receiving side of the connector body is formed, wherein
    in a first method step a sealing element is inserted into the annular chamber of the plug connector between a first and second casing section;
    in a second method step the connecting section of the pipe is pushed from the pipe receiving side of the connector body into the annular chamber of the plug connector and positioned;
    in a third method step a pressing tool deforms the first casing section of the connector body, wherein a first portion of the pressing tool deforms the first casing section so that a form-fitting connection is formed between the pipe and plug connector, and a second portion of the pressing tool deforms an axially spaced apart part of the first casing section so that the sealing element is compressed by the first casing section and is thus clamped between the first casing section and pipe.

9. The method as claimed in claim 8, wherein during the shaping process the movement path of the pressing tool is monitored, wherein prior to the deformation and/or during the deformation of the first casing section by at least one distance measuring device the surface of the pipe facing the window opening is detected through a window opening in the second casing section and the first casing section is deformed as a function of the result of the detection of the surface of the pipe performed by the distance measuring device.

10. The method as claimed in claim 8, wherein during the shaping process the force applied by the pressing tool on the first casing section is measured and actively defined.

11. The method as claimed in claim 8, wherein before the second method step the correct positioning of the sealing element in the plug connector is checked by the measuring device.

12. A connector assembly comprising:
(a) a pipe;
(b) a sealing element; and
(c) a plug connector with a connector body;
    wherein the connector body has an annular chamber which lies between a sleeve-like, first casing section of the plug connector annularly surrounding a central longitudinal axis in cross-section and a sleeve-like second casing section of the plug connector annularly surrounding the central longitudinal axis in cross-section,
    wherein the first casing section is surrounded by the second casing section, and the first casing section of the connector body is connected to the second casing section at a first end section by a first end wall section, and the casing sections are open to one another at a second end section, whereby a pipe receiving side of the connector body is formed,
    wherein a connecting section of the pipe is inserted from the pipe receiving side into the annular chamber of the connector body and connected to the latter,
    wherein the connecting section of the pipe comprises a fixing recess formed on a circumferential surface of the pipe and a seal retainer which is structurally separate from the latter,
    wherein in an assembled state of the connector assembly a form-fitting connection is produced between the first or second casing section of the connector body and fixing recess of the pipe,
    wherein the first or the second casing section is deformed in the region of the seal retainer such that the sealing element is pressed between the first or second casing section and seal retainer, and
    wherein the first casing section of the connector body extends in the assembled state of the connector assembly as viewed in axial direction over the fixing recess and also over the seal retainer of the pipe, so that both the pressing in the region of the fixing recess and the pressing in the region of the of the sealing element are performed by a deformation of the first casing section.

13. A connector assembly comprising:
(a) a pipe;
(b) a sealing element; and
(c) a plug connector with a connector body;
    wherein the connector body has an annular chamber which lies between a sleeve-like, first casing section of the plug connector annularly surrounding a central longitudinal axis in cross-section and a sleeve-like second casing section of the plug connector annularly surrounding the central longitudinal axis in cross-section,
    wherein the first casing section is surrounded by the second casing section, and the first casing section of the connector body is connected to the second casing section at a first end section by a first end wall section, and the casing sections are open to one another at a second end section, whereby a pipe receiving side of the connector body is formed,
    wherein a connecting section of the pipe is inserted from the pipe receiving side into the annular chamber of the connector body and connected to the latter,
    wherein the connecting section of the pipe comprises a fixing recess formed on a circumferential surface of the pipe and a seal retainer which is structurally separate from the latter,
    wherein in an assembled state of the connector assembly a form-fitting connection is produced between the first or second casing section of the connector body and fixing recess of the pipe,
    wherein the first or the second casing section is deformed in the region of the seal retainer such that the sealing element is pressed between the first or second casing section and seal retainer, and
    wherein the seal retainer of the pipe is designed as a stepped edge formed on the inner casing surface, in which the sealing element is mounted.

14. A connector assembly comprising:
(a) a pipe;
(b) a sealing element; and
(c) a plug connector with a connector body;
    wherein the connector body has an annular chamber which lies between a sleeve-like, first casing section of the plug connector annularly surrounding a central longitudinal axis in cross-section and a sleeve-like second casing section of the plug connector annularly surrounding the central longitudinal axis in cross-section,
    wherein the first casing section is surrounded by the second casing section, and the first casing section of the connector body is connected to the second casing section at a first end section by a first end wall section, and the casing sections are open to one another at a second end section, whereby a pipe receiving side of the connector body is formed, wherein a connecting section of the pipe is inserted from the pipe receiving side into the annular chamber of the connector body and connected to the latter, wherein the connecting section of the pipe comprises a fixing recess formed on a circumferential surface of the pipe and a seal retainer which is structurally separate from the latter, wherein in an assembled state of the connector assembly a form-fitting connection is produced between the first or second casing section of the connector body and fixing recess of the pipe, wherein the first or the second casing section is deformed in the region of the seal retainer such that the sealing element is pressed between the first or second casing section and seal retainer, wherein the sealing element has a cylindrical inner casing surface and a cylindrical outer casing surface, and wherein in the installed state of the sealing element the cylindrical inner casing surface bears on the first casing section of the connector body and the cylindrical outer casing surface bears on an inner casing surface of the seal retainer of the pipe.

15. A connector assembly comprising:
(a) a pipe;
(b) a sealing element; and
(c) a plug connector with a connector body;

wherein the connector body has an annular chamber which lies between a sleeve-like, first casing section of the plug connector annularly surrounding a central longitudinal axis in cross-section and a sleeve-like second casing section of the plug connector annularly surrounding the central longitudinal axis in cross-section, wherein the first casing section is surrounded by the second casing section, and the first casing section of the connector body is connected to the second casing section at a first end section by a first end wall section, and the casing sections are open to one another at a second end section, whereby a pipe receiving side of the connector body is formed, wherein a connecting section of the pipe is inserted from the pipe receiving side into the annular chamber of the connector body and connected to the latter, wherein the connecting section of the pipe comprises a fixing recess formed on a circumferential surface of the pipe and a seal retainer which is structurally separate from the latter, wherein in an assembled state of the connector assembly a form-fitting connection is produced between the first or second casing section of the connector body and fixing recess of the pipe, wherein the first or the second casing section is deformed in the region of the seal retainer such that the sealing element is pressed between the first or second casing section and seal retainer, and wherein the pipe has at least one axially extending recess on its connecting section on the end face wall, which recess corresponds with a positioning tab in the connector body.

\* \* \* \* \*